July 2, 1940.  E. G. REID  2,206,202
MOTOR VEHICLE
Filed Feb. 24, 1937   5 Sheets-Sheet 2
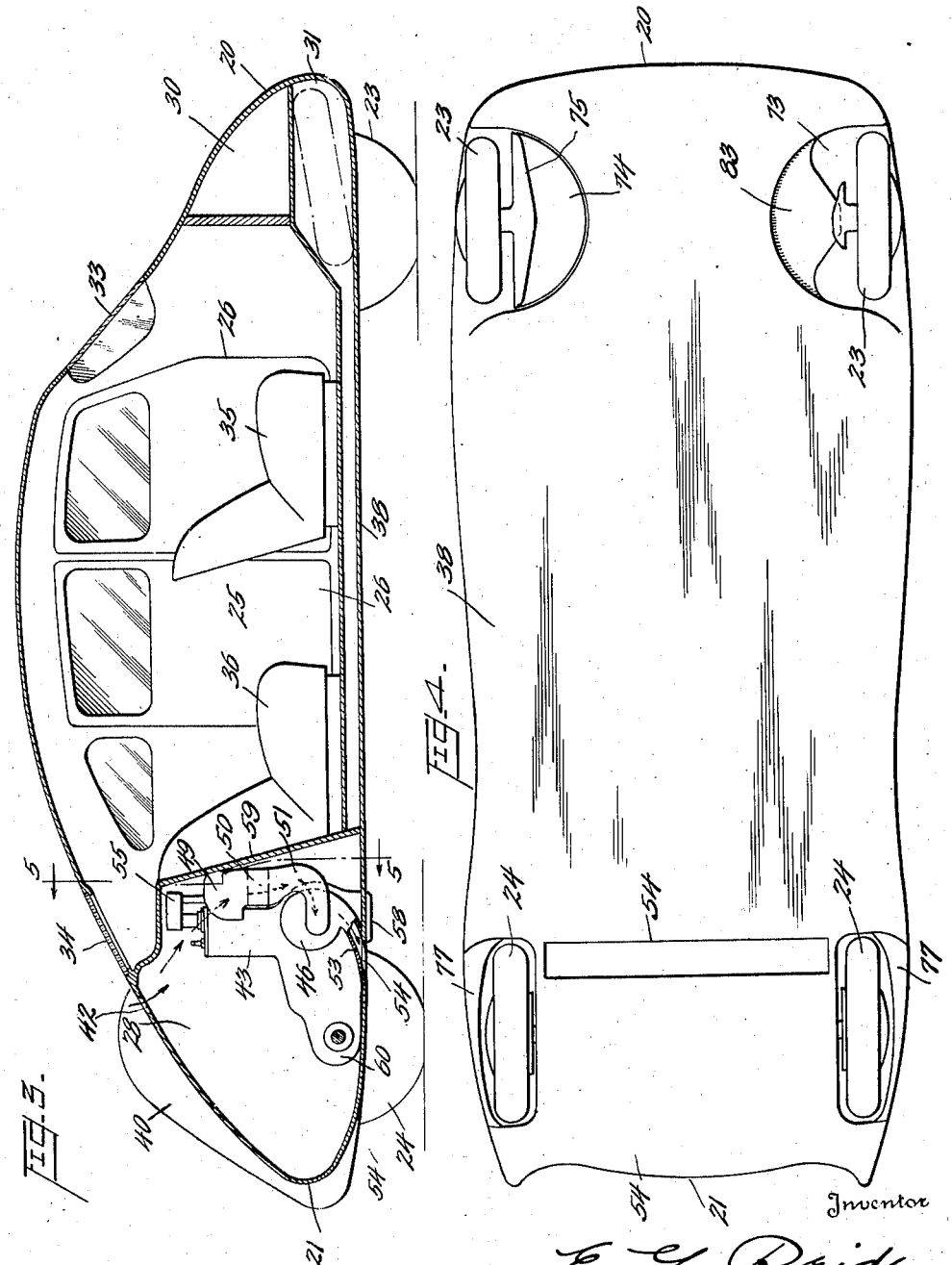

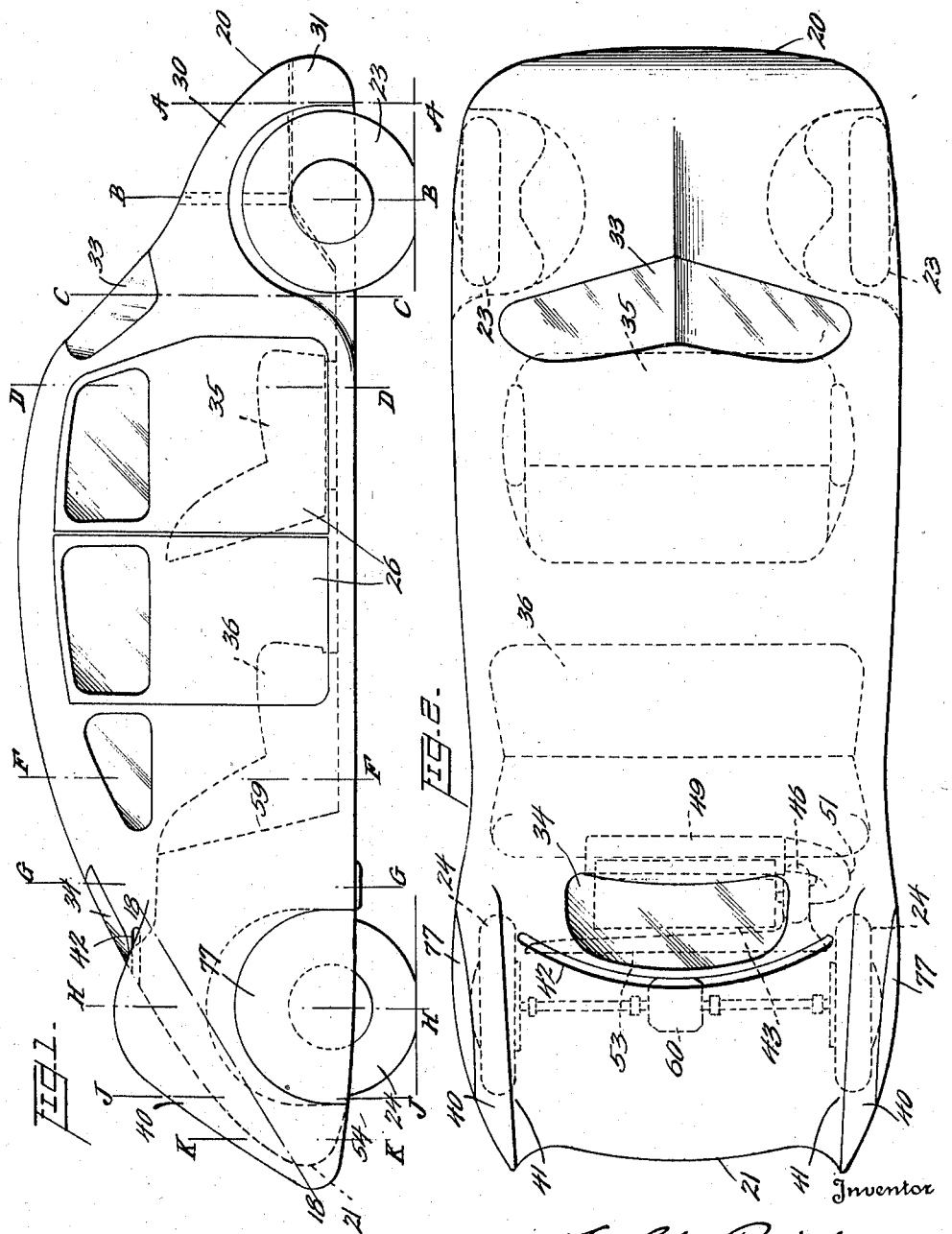

July 2, 1940.  E. G. REID  2,206,202
MOTOR VEHICLE
Filed Feb. 24, 1937   5 Sheets-Sheet 3
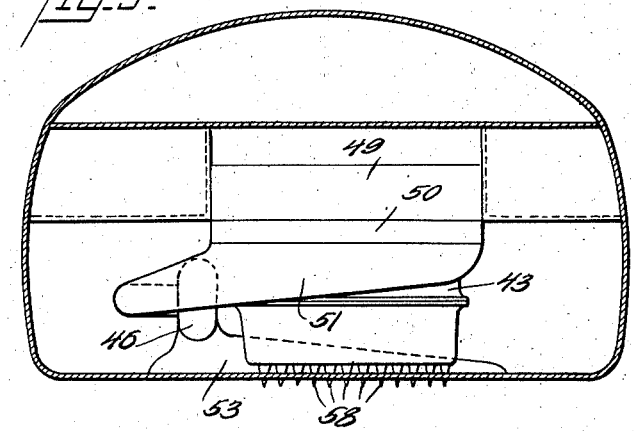
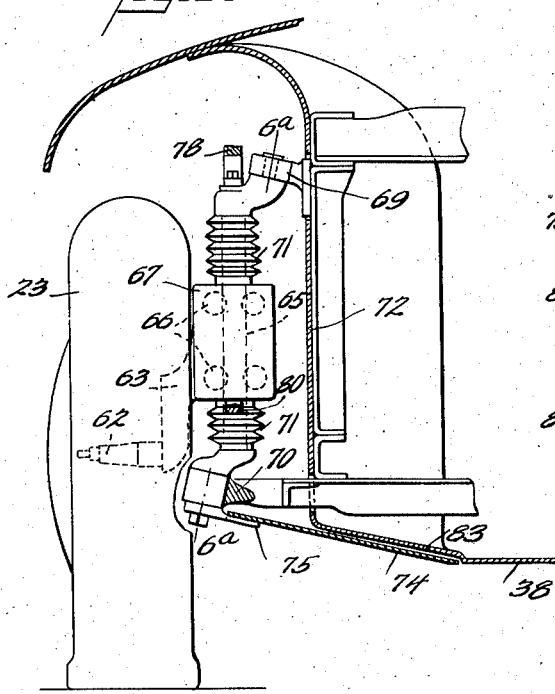
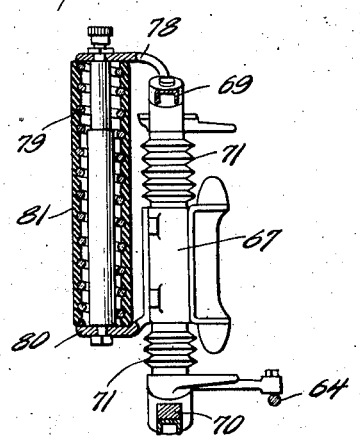

July 2, 1940.  E. G. REID  2,206,202
MOTOR VEHICLE
Filed Feb. 24, 1937  5 Sheets-Sheet 4
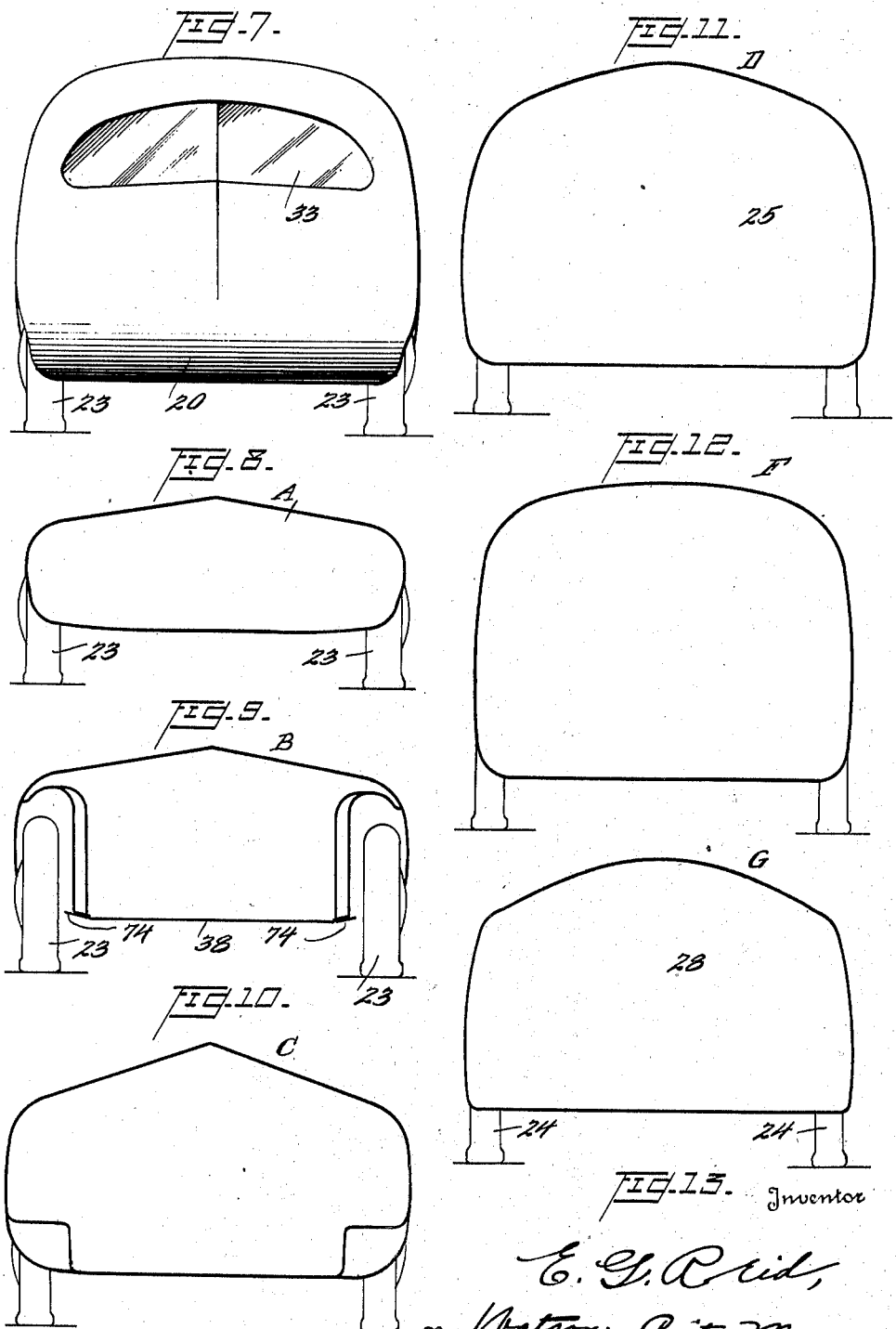

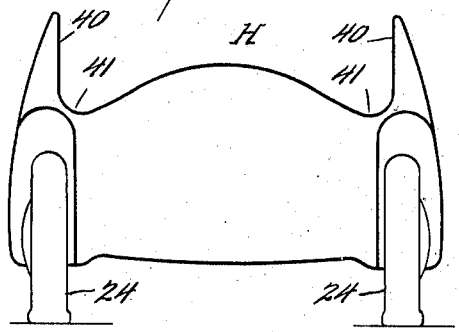
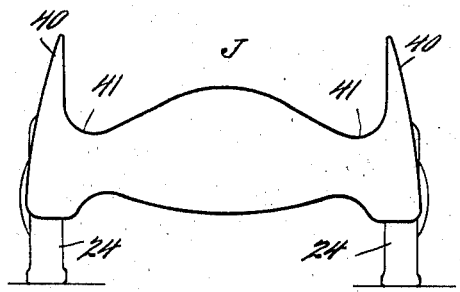
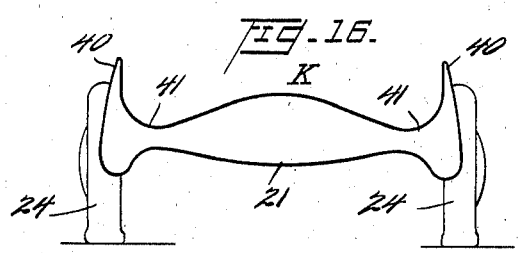
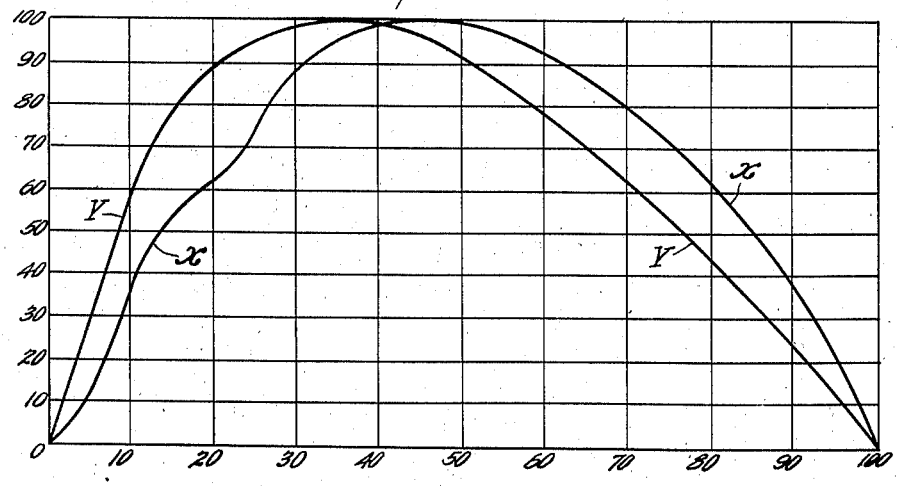
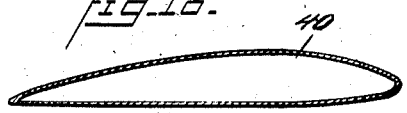

Patented July 2, 1940

2,206,202

UNITED STATES PATENT OFFICE 2,206,202

MOTOR VEHICLE

Elliott G. Reid, Palo Alto, Calif., assignor to Packard Motor Car Company, Detroit, Mich., a corporation of Michigan Application February 24, 1937, Serial No. 127,540

6 Claims. (Cl. 296—1)

This invention relates to motor vehicles and is more particularly concerned with improvements tending to reduce the wind resistance to movement of vehicle bodies. It is the principal object of the invention to provide a vehicle which is so modified with respect to existing vehicles as to materially improve the aerodynamic characteristics of the body while maintaining or improving upon present standards of overall length, seating capacity, roominess of the body, comfort of the passengers and driver, and the accessibility of the body as regards ingress and egress.

The performance and economy characteristics of any self-propelled vehicle are primarily determined by the conditions of equilibrium between the power required and the power available for propulsion. Up to the present, improvements of automobile performance have been accomplished almost entirely by increasing the power available, and economy has suffered whenever the overall thermal efficiency of the power plant has not been correspondingly improved. For a variety of reasons, little attention has been paid to reducing the power requirements, although this is the only plan of attack which can lead to simultaneous improvements of both economy and performance, regardless of the progress of power plant development.

Although analysis reveals that major reductions of motor car air resistance would be of value at low as well as at high speeds, the potentialities of such aerodynamic refinement have not been realized because it has appeared, until now, that the requirements of low air resistance are incompatible with those of practical utility. The chief obstacle has been the generally accepted principle that the rear portion of a body must taper smoothly and gradually toward a point or edge if low resistance is to be attained. The conflict between this principle and the practical limitation of overall length is obvious when one contemplates the conventional arrangement in which an engine of small cross-sectional area is located forward of a passenger compartment of large transverse dimensions. Although it might seem that the substitution of a rear engine arrangement would permit of considerable reduction of the overall length required for an aerodynamically satisfactory body, practical considerations again intervene in such forms as passenger space limitations, difficulty of arranging for entrance and egress, head-on crash hazard, engine cooling problems, etc.

The present invention may be described as a new type of streamline, rear engine motor car in which a major reduction of air resistance has been effected without exceeding the highly important limitation of overall length and without sacrificing any of the aforementioned qualities of practical importance. The principal innovations which have made this possible are described below.

1. *Disposition of principal components.*—The two transverse passenger seats are located forward of the rear wheels and aft of the front wheels; they may extend across the full width of the body. The whole passenger compartment is placed as far forward as is compatible with accessibility to the seats through conventional, side-opening doors. The slope of the roof line and the taper of the tail are thus made as small as is possible with a given transverse profile and limited overall length. The power plant, which may be of in-line or V type, is located between the rear seat and the rear axle; it is preferably mounted transversely and therefore occupies little longitudinal space.

2. *Basic body form.*—In the construction of the body, it is sought to minimize both the component of resistance due to shape (form drag) and that arising from the creation of lift (induced drag). To obtain a small form drag, the variation of cross-sectional area with length is patterned after that of an airship hull of known merit (U. S. N. C-class hull) and the external contours, particularly those of the critical portion aft of the largest transverse section, are made as smooth as possible in order to eliminate possible obstacles to the maintenance of smooth air flow around the body. The suppression of induced drag is accomplished by shaping the body in such a way as to minimize its lift without augmenting the form drag.

The application of these principles to the problem of enclosing the passenger compartment and chassis leads to a body of approximately uniform width which has a relatively flat under surface and a generally convex upper surface: it leaves exposed to the passing air only the lower parts of all four wheels and the outer faces of the two front wheels. The area of the largest transverse section is between 0.07 and 0.16 times the square of the over-all length; this section is located forward of midlength and aft of quarter-length. The details of the forms of the nose and tail which serve to reduce the induced drag will be described later.

3. *Fins.*—In spite of having an airship-like distribution of cross-sectional area, this motor car body differs so markedly from its symmetrical prototype that its air resistance would be unacceptably large were it not for the utilization of certain auxiliary devices and methods for maintaining continuous air flow around it. The twin fins which characterize the design serve several purposes, one of which is to exercise control over the flow of air around the rear portion of the body. One fin is located over each rear wheel; both lie approximately in vertical longitudinal planes and their horizontal profiles are similar to airplane wing sections. These fins influence the character of the airflow in their neighborhood by producing there a different space rate of static pressure variation along the direction of flow—subsequently termed "longitudinal pressure gradient"—than that which would occur in their absence. This action and its significance are explained below.

Some definitions and statements of principles necessarily preface this explanation. In steady fluid motions, the flow velocity and the static pressure are inversely related, i. e., increased velocity is accompanied by reduced pressure and vice versa. The character of the pressure variation along a streamline is described as an adverse pressure gradient if the velocity is reduced and the pressure correspondingly increased as a mass of fluid traverses that region. Adverse pressure gradients characterize the flow of fluids around the downstream portions of most bodies which are tapered toward the rear. These facts are important because the separation of continuous flow from the surface of a body can occur only in a region where the pressure gradient is adverse, because the probability of separation increases with the severity of the gradient and because separation results in increased resistance due to the production of a turbulent wake. The action of the fins is to superimpose a favorable pressure gradient upon the adverse one which would exist in their absence and thus to eliminate or, at least, suppress flow separation from the rear part of the body. Experiments have demonstrated that the resistance of a body of the proposed type may be reduced by the addition of a suitable pair of fins.

Although it is impossible to define, dimensionally, the shapes and orientations of fins required to produce this beneficial effect, an accurate specification of the essential characteristics can be made in terms of the forces involved. To obtain the desired effect, the fins must be so shaped and so disposed that the transverse components of the resultant air forces which act upon them will be directed away from, rather than toward, the plane of symmetry of the body. Another feature of importance is the fillets which should be provided at the junctures of the inner faces of the fins with the upper surface of the body; the radii of these fillets should increase from front to rear in order that objectionable flow retardation shall not occur in those regions.

Another function of the fins is to provide directional stability. It is well-known that conventional automobiles drift laterally, when driven in cross winds, unless restrained through steering corrections; this is simply evidence of an inherent tendency to yaw away from the wind rather than heading up into it like a weathervane. If a motor car possessed the directional stability characteristics of a weathervane, the transverse forces exerted upon it by the wind and by the road would be opposed, even though no steering corrections were made, the tendency to drift laterally with the wind would be reduced or eliminated and the car would become more easily manageable in cross winds. The presence of the twin fins modifies the undesirable characteristics, just as an increase of vane area makes a given weathervane more stable, and adequate fins are capable of rendering the rear engine car definitely stable in the directional sense.

The third function of the fins is to house the upper parts of the rear wheels and to afford them ample room for the upward displacements caused by road irregularities. Utilization of the interior of the fins for this purpose makes it possible to reduce the transverse sectional area of the body in the region between the rear wheels and thus to follow the prototype cross-sectional area distribution more accurately by eliminating the extreme bluntness of tail which would be unavoidable with a body of equal rearward extent in which the height of the whole upper surface was fixed by the positions of the fully deflected wheels.

4. *Boundary layer control.*—Although it has been stated that the existence of an adverse pressure gradient is a prerequisite to flow separation, it must be pointed out that separation actually does occur only when certain conditions have been established in the "boundary layer" of the flow. This designation is applied to that layer of fluid which is adjacent to a boundary surface and in which the velocity has been appreciably reduced by the action of skin friction. It has been experimentally demonstrated that separation may be prevented or suppressed by artificial control of the conditions in the boundary layer. One proven method is to remove the retarded fluid by the application of suction to slots in the boundary surface; another is to accelerate the retarded layer by discharging fluid tangentially along the surface.

All the mechanism necessary for the use of both of these methods is already available as an essential component of the conventional automobile power plant wherein engine cooling is effected through the radiation of heat to air which is circulated by a fan or blower. Heretofore, cooling has been the only function of this auxiliary. The present invention contemplates the use of slots in the upper surface of the body in the region between the fins for the intake of engine cooling air as well as the tangential discharge of this air through a rearwardly directed slot in the rear portion of the lower surface. Thus the fin action is supplemented by suction control of the upper surface boundary layer and separation of the flow from the upcurved lower surface is suppressed by the accelerating action of the discharged jet. It is thus apparent that this improvement of aerodynamic qualities is accomplished by the dual utilization of energy primarily required for another purpose.

It is also noteworthy that one of the effects of fin action is the augmentation of pressure in the region selected for the cooling air intake slot; this is advantageous because it is equivalent to reducing the load on the blower.

5. *Wheel pocket covers.*—It has been found that the body recesses which must be provided to accommodate the steering displacements of the front wheels cause a large amount of air resistance. The sides of the recesses are masked by the wheels which serve, when in the straight-ahead position, as fairings for the body sides but the recesses are completely open as seen from below the body. The importance of the flow disturbances produced by these cavities was proved by covering them during some model tests. Closures or pocket covers for the bottoms of these recesses are therefore incorporated as a part of this invention.

The essential characteristics of the pocket covers are that they form smooth continuations of the parts of the lower body surface adjacent to them, that they partake of the steering rotation of the wheels and that they cover or mask those parts of the recesses not occupied by the wheels. Although it is desirable that the pocket covers shall not share the vertical motions of the adjacent wheels, this feature is of quantitative rather than of qualitative importance and considerable benefits may be obtained by the use of covers which share the vertical displacements as well as the steering motions of the wheels.

6. *Nose shape.*—Body resistance has been found very sensitive to changes in the form of the nose. In this case, an adverse pressure gradient along the lower surface of the body may cause serious flow disturbances in the neighborhood of the front wheels. Control of this gradient is readily obtainable through modifications of form and it has been determined that the use of a depressed nose resulted in less air resistance, even with pocket covers in place, than did one of more nearly symmetrical form.

This body construction is, therefore, characterized by a depressed nose, i. e., the forward portions of the vertical longitudinal sections are asymmetrical and the foremost points of these profiles are relatively close to the forward prolongation of the undersurface contours which are, themselves, substantially horizontal in this region. It should be added that, in addition to its effects upon form drag, the depression of the nose results in a reduction of the lift and, consequently, a reduction of the induced drag.

7. *Tail form—lower surface.*—Since it is known that the elevation of a flap which constitutes the rear portion of an airplane wing reduces both the lift and resistance of that wing, a similar distortion may be expected to have like effects in the case of the automobile body. This deduction having been verified experimentally, an upward sweep of the rear portion of the lower body surface is one of the features of this invention. Since the possibility of flow separation exists in this region, the rearward discharge of the cooling air for purposes of boundary layer control is considered an important adjunct to this feature.

Although the features described above have been devised primarily in effort to minimize air resistance, their use offers several important and heretofore unmentioned advantages over the conventional type and over other so-called streamline cars.

Riding qualities are improved by the location of the passengers close to the center of gravity of the car. Since the majority of the variable load consists of passengers who occupy the rear seat, and since the positions of the rear seat and the center of gravity almost coincide, the variation of riding qualities with load will be very slight.

The location of the power plant behind the passenger compartment eliminates noise, engine fumes and the vibration of the conventional power transmission system. The mechanism for power transmission may be greatly simplified when the engine crankshaft is both close to and parallel to the driven axle. It is also important that the frontal area of the body and the height of the center of gravity of the car may be reduced by the lowering of the passenger compartment which becomes possible when the engine is located in the rear and no transmission mechanism is present beneath the floor.

Another feature of considerable practical importance arises from the use of a pair of fins located at the sides of the body in place of the single central fin which has been used occasionally. Whereas he single fin obstructs the rearward view obtainable through the back window, the twin fins entirely eliminate this objectionable feature.

Finally, engine cooling in hot weather is made somewhat less difficult than usual by the induction of air at some distance above the road surface. This is true because air temperatures are known to decrease rapidly with distance from the surface under most hot weather conditions.

Further objects and features of the invention will be apparent from the following description taken in connection with the accompanying drawings, in which Figure 1 is a side elevation of a motor vehicle constructed in accordance with the principles of the invention;

Figure 2 is a plan view of the vehicle shown in Figure 1;

Figure 3 is a central, vertical, longitudinal section of the vehicle;

Figure 4 is a bottom plan of the vehicle;

Figure 5 is a transverse section taken substantially on the line 5—5 of Figure 3;

Figure 6 is a partial transverse, sectional view showing a form of suspension for one of the steerable road wheels;

Figure 6a is a vertical sectional view taken substantially on the line 6a—6a of Figure 6;

Figures 7 to 16 inclusive are diagrammatic transverse sectional views at points (indicated by letter) spaced substantially equidistant along the length of the vehicle, these views showing approximately the transverse sectional area and the contour of the vehicle;

Figure 17 is a graphical comparison of the variation in cross-sectional area of the vehicle as compared with that of the C-class Navy airship hull;

Figure 18 is a sectional view through one of the fins taken substantially on the line 18—18 of Figure 1.

For convenience in describing the invention, reference is made to the vehicle chosen for illustration in the accompanying drawings and specific language is employed. It will nevertheless be appreciated that the invention is not limited to this precise construction and arrangement; it will be apparent from the description and appended claims that various modifications of the several features referred to herein are contemplated as a part of the invention and that many of these features may be employed separately rather than in conjunction with the others with highly improved results.

The forward portion or nose of the vehicle is indicated in the drawings at 20, and the rearward portion or tail at 21, the forward steerable road wheels and the rear driving wheels being shown at 23 and 24 respectively. The vehicle body is preferably divided as shown into a number of compartments, including a generally centrally located passenger compartment 25 having conventional entrance and exit doors 26 therein, a rearwardly disposed motor compartment 28, and storage space in the vehicle nose including, for example, a luggage compartment 30 and a compartment 31 for receiving a spare tire, tools, or the like, the compartments in the nose and the engine compartment 28 being accessible through suitably disposed openings which are normally closed by hinged panels or the like. The forward windshield 33 may be in the shape of a flat V in horizontal section, being formed of two flat glass plates which are substantially flush with the adjacent body panel. While the contour of the vehicle may be smoothly curved in horizontal section at this point, curved windshield glass being employed, the difference in effect on the aerodynamic characteristics of the vehicle is negligible. At the rear of the vehicle, however, conditions are more critical and it is therefore preferable to employ a curved rear vision glass 34 conforming to the contour of the body panel at that point, the periphery of the glass being substantially flush with the adjacent panel.

In the sedan type of vehicle which is chosen for illustration, two seats 35 and 36 are provided, these seats being accessible as hereinbefore explained through conventional side doors 26 and preferably extending the full width of the passenger compartment 25. It will be appreciated that these seats are located generally centrally of the vehicle so as to afford maximum head room and seat width and to promote riding comfort, the occupants of either seat being located intermediate the axles or equivalent road wheel suspension means. Preferably the seats are arranged entirely forward of the rear wheels and entirely aft of the forward wheels. Owing to the fact that the forward seat 35 is located a substantial distance in the rear of the extreme front end of the vehicle and rearwardly of the front road wheel pockets, this seat can be as wide as the rear seat 36, and the occupants of the forward seat experience a feeling of security not afforded in vehicles in which the driver is seated at the extreme forward end of the body. It is found that with this arrangement of passenger compartment, the accommodations are in every way comparable or superior to those found in more conventional vehicles which are well designed as regards comfort but which lack the low air resistance characteristics afforded by the vehicle described herein.

The bottom of the vehicle is substantially completely enclosed by a lower panel 38 which affords a generally flat lower surface, this panel being inclined upwardly toward the rear in a smooth curve from a point somewhat forward of the rear axle, whereby the lift of the whole body is materially reduced with corresponding reduction of the induced drag. Both the induced drag and the form drag are materially reduced by depression of the vehicle nose as hereinbefore explained.

In order that the over-all length of the vehicle will not materially exceed standard practice, the upper surface of the tail 21 is preferably sloped downward at a fairly steep angle, sufficiently steep to result in separation of continuous flow from the surface at a point well forward of the extreme rear of the tail in the absence of special precautions for reasons hereinbefore more fully set forth. To avoid this very serious impairment of the aerodynamic efficiency of the vehicle, fins 40 are provided at each side of the body, these fins forming continuations of and merging into the adjacent portions of the body. From the plan view of these fins afforded by Figure 2 and from the contours shown in Figures 14 to 16 and 18 it will be seen that they are generally of airfoil profile, although a wide variation of fin shape and arrangement is permissible.

As is hereinbefore indicated, the purpose of these fins is the elimination or suppression of flow separation over the tail by establishment of a more favorable pressure gradient. In general, the fins will function satisfactorily if they are so formed and positioned that the transverse components of the resultant air forces act thereon in an outward direction, i. e., away from the central, vertical, longitudinal plane of the vehicle. The fins are shown as toed outwardly toward the front of the vehicle, such disposition of the fins contributing materially to the desired result. It will nevertheless be appreciated that other factors, for example the fin profiles, likewise determine to a considerable extent the resultant of the forces acting thereon. The employment of fins of this general character, while particularly important in improving flow conditions over the vehicle tail, may be employed at some other critical point if desired.

The lines of juncture of the fins with the intermediate portion of the upper panel of the tail are critical points and it is found that care must be exercised here to prevent excessive retardation of air flow. This is preferably effected by the employment of fillets between the fins and the intermediate panel which expand rearwardly; in other words, the radii of the fillets increase substantially from the front toward the rear of the tail. These expanding fillets are shown more particularly in Figures 14 to 16 inclusive in which they are designated by the reference character 41. It will be observed that while these fins give directional stability to the vehicle as hereinbefore explained, there is no interference with direct rearward visibility from the window 34 and the fins may be made sufficiently low to avoid impairing lateral visibility without adversely affecting the principal functions thereof.

Obviously it would not be possible, without sacrifice of other advantages outlined herein, to bring the rear of the vehicle down sharply as is shown in the drawings in the absence of the fins 40 which may be very conveniently employed to house the upper portions of the wheels. The fins 40 perform the further function, by reason of their action in increasing the pressure over the vehicle tail, of facilitating the introduction of air through the transversely disposed slot or opening 42 in the upper tail surface, this air being necessary for the cooling of the engine 43 which is located within the rear compartment 28. At the same time, as hereinbefore set forth, the flow of air into this compartment from the upper surface of the tail effects removal of retarded fluid at this critical point and further aids in the establishment of a smooth flow over the tail. The form and location of the opening 42 may be varied to a considerable extent; although it is preferable to withdraw the air from the forward portion of the tail, rearward location of the intake is reasonably effective and several distributed openings may be employed. It will also be understood that the instant invention contemplates the employment of this method of facilitating air flow by the withdrawal of air from the exterior surface of the vehicle body at various other points, and either in conjunction with or wholly apart from fins of the character described herein.

It will be appreciated that there is, despite the effect of the fins in increasing the air pressure adjacent the opening 42, decidedly less pressure applied to the engine air intake than is afforded by the full impact pressure on the nose radiator of a modern vehicle of conventional type. It is therefore highly desirable to employ an efficient blower for increasing the rate of air flow through the radiator in the instant construction. This blower may be of the Sirocco type, such as is indicated at 46, and may be mounted on one end of the engine crankshaft, as shown more particularly in Figures 3 and 5, or may be driven therefrom in any convenient manner, for instance by means of a pulley on the crankshaft.

The air passing through the opening 42 may flow downwardly and forwardly about and over the engine block and toward and through the radiator 50. A casing 49 which is open at the top and rear directs the air into the radiator at the upper side of the latter, the air flowing downwardly through the radiator, into a conduit 51 to the blower 46, and thence through a discharge conduit 53 which communicates with a transversely extending opening 54 in the lower panel of the vehicle body. Preferably the conduit 53 and opening 54 are so arranged that the air is discharged substantially tangentially to the lower panel. Thus the air flow beneath and at the rear of the vehicle is accelerated to suppress separation of flow from the upwardly curving lower surface of the vehicle as hereinbefore explained. An expansion tank 55 may communicate with the radiator and any suitable provision may be made for filling the radiator, for example, a filling tube extending to a convenient point on the exterior of the body may be used.

Cooling fins 58 are preferably formed integrally with the lower engine pan and extend downwardly through the panel 38, being disposed in planes parallel to the direction of flow of air so as to offer minimum resistance. By this or some equivalent means the engine oil can be maintained at a satisfactory temperature although the engine is otherwise entirely enclosed within the body, and the use of unsightly louvres tending to decrease the aerodynamic efficiency of the vehicle is avoided.

It will be observed that the engine 43 extends transversely of the vehicle and is preferably the type in which the cylinders are arranged in line so as to occupy a minimum of space in the direction of the length of the vehicle to permit the rear of the body to be brought down severely, although a V-type engine may be used. The rear road wheels 24 are driven in any suitable manner from the engine 43 through gearing disposed within a housing 60, which gearing will preferably include the usual change speed transmission gearing and the conventional differential gearing, and the road wheels 24 may be supported for rising and falling movement in any desired manner.

One method of effectively closing the pockets for the front steerable wheels 23 is shown in detail in Figures 4 and 6 of the drawings. The wheel suspension selected for illustration is one disclosed more particularly in the prior application for U. S. Letters Patent of Frank C. Best, Serial No. 91,229, filed July 17, 1936, to which reference may be had for a more detailed disclosure. For the purpose of describing the present invention the essential elements of this suspension as shown in Figures 6 and 6a will suffice. Thus the road wheel 23 is supported on the conventional wheel spindle 62 which projects laterally from a wheel carrying member 63, the latter being supported on a generally vertical spindle 65 for bodily displacement lengthwise thereof and for rotation therewith, rollers 66 mounted in a casing 67 which forms a part of the wheel carrier 63 being received in coacting guide grooves formed in the spindle 65 and extending longitudinally thereof, this construction affording the equivalent of a simple sliding and non-rotative connection between the carrier 63 and the spindle 65.

The spindle 65 is supported in brackets 69 and 70 secured to the vehicle frame, in which brackets the spindle is journalled for rotation about a generally upstanding axis, the axis corresponding to the more conventional steering knuckle axis and being preferably inclined with respect to the vertical to afford the usual wheel caster effect and to improve resistance to braking effort. Rotation of the spindle 65, the wheel carrier 63, and the road wheel 23 about this upstanding axis is effected by any conventional steering linkage connected with the steering arm 64 for the purpose of imparting steering movement to the road wheel in a generally horizontal plane. Flexible dust shields 71 surround the spindle 65 and are secured at their ends to the spindle and to the casing 67 for the purpose of excluding dust from the relatively moving parts. An arm 78 secured to the upper end of the spindle 65 serves as an abutment for a coil spring 79, the spring engaging at its lower end with an arm 80 secured to the casing 67. Preferably the spring is embedded in a sheath 81 of rubber or other imperfectly elastic, deformable material, this material serving to support and house the spring, to increase the resistance to flexure of the latter, and to damp vibrations and prevent surging of the spring.

It will be observed that with this construction the road wheel rises and falls in a substantially vertical path during movement of the vehicle over an irregular road bed. The wheel suspension is relatively light and compact and lends itself well to use in a vehicle of the type described herein. It will nevertheless be appreciated that other forms of wheel suspension in which the road wheels partake of movements of a slightly different nature in rising and falling may be employed in lieu of the suspension illustrated herein, the present invention residing only in the association with the wheel suspension of means for closing the wheel pockets.

The wheel pockets for the wheels 23 may be formed by cutting away the side panels and the bottom panel of the vehicle body to an extent sufficient to permit requisite movement of the wheels, the opening in the lower body panel 38, designated at 73, being preferably of the shape shown more particularly in Figure 2 so as to adequately accommodate the peripheral portions of the road wheels during steering but extending outwardly adjacent the wheel spindles to afford more room within the interior of the vehicle. A panel 72 extending between the side and bottom panels and so shaped as to afford maximum space within the vehicle body without interference with wheel movement may complete the enclosure of each pocket. A generally semi-circular closure plate 74 is supported on a bracket 75, the latter being secured to the lower end of the upstanding spindle 65 so as to rotate therewith as the road wheel is steered. The closure plate is illustrated as disposed in a plane substantially perpendicular to the king pin axis, so that the edge of the plate will not rise and fall below the adjacent edge of the lower panel of the body as the wheel is steered. If desired the lower panel may be provided with an offset flat portion 83 as shown more particularly in Figure 6 to afford closer cooperation with the closure plate and further retard flow of air therebetween. Thus each opening 73, or such portion thereof as lies inwardly of the associated road wheel 23 remains closed regardless of steering or rising and falling movement of the road wheel, and in effect the lower panel 38 is practically continuous between the oppositely disposed road wheels. The result is more effectively achieved by reason of the fact that the plate 74 does not rise and fall with its associated road wheel. It will be appreciated, however, that in some instances it may be desirable to so support the plate 74 as to cause the latter to partake of such rising and falling movement, but the slight displacement of the plate under normal conditions and on smooth roads will not materially adversely affect the smooth flow of air beneath the vehicle. If desired, the closure plate 74 may be provided with one or more louvres for the purpose of cooling the road wheel brakes, but it is preferable to rely for cooling either on such flow of air as may occur between the closure plates and the lower body panel 38 or to provide some other method of cooling which will avoid any interruption of air flow at this critical point.

If the closure plate 74 is disposed as shown in Figure 6 in a plane perpendicular to the axis of the wheel spindle, it is of course advisable to so form the portions of the lower panel immediately forward and rearward of this closure plate so as to avoid any sharp break in the contour thereof. This is in general preferable to disposing the closure plate in a substantially horizontal plane since the plate will occupy this plane only when the wheels are in the straight-ahead position, but the latter arrangement is also contemplated as a part of the instant invention.

Preferably cover plates for the front wheel side pocket openings are omitted, the wheels being so disposed that they act as reasonably efficient fairings to prevent materially adverse effect on the air stream. The rear wheels are shown, however, as provided with side cover plates 77 which are secured in position in any convenient manner for ready removal to permit access to the wheels. These plates are so shaped as to form continuations of the adjacent portions of the side and bottom body panels.

Headlamps may be disposed within the vehicle nose if desired, so as to avoid any disturbance of the body contour. It has been found, however, that no serious adverse effect on the aerodynamic efficiency of the body results from the use of protruding headlamps, although these should preferably be formed so as to merge with the surface of the body nose, for example in the manner employed in some vehicles in mounting the headlamps on the fenders.

The general contour of the vehicle has been hereinbefore described as being such as to compare favorably with accepted practice in the field of airship construction and the results achieved are apparent from an inspection of Figure 17 in which the variation in cross-sectional area of the vehicle is compared with that of the C-class Navy airship hull. In this figure the ordinates represent the percentage of maximum cross-sectional area and the abscissae represent percentage of length, curve X being that of a vehicle body such as is illustrated herein and curve Y being that of the C-class airship hull. It will be appreciated that these curves are almost identical, the curve X being smooth, continuous, and without abrupt changes of slope; it is particularly significant that there are no points of inflection in the portion of this curve which lies to the right of the maximum ordinate, i. e., the section corresponding to the part of the body which is aft of the largest transverse section. The maximum cross-sectional area occurs at about 45% of the length measured from the forward end.

By the employment in a vehicle of the more important features of the instant invention it has been found possible to reduce the air resistance to less than one-third of that of the conventional modern car without violating present standards of over-all length, ground clearance, overhang beyond the road wheels, maximum width, convenient and comfortable seating, accessibility, and directional stability in cross winds. One of the most important factors in this accomplishment is the reduction of induced drag brought about by the suppression of lift. The depressed nose, the up-swept rear lower surface and the twin fins which experience outwardly directed air forces all contribute materially toward this end. It is believed that the present invention constitutes the first example of intentional application to motor car construction of the aerodynamic principle of drag reduction through lift suppression.

Having thus described the invention, what is claimed as new and desired to be secured by Letters Patent is:

1. A motor land vehicle body having an upper external surface sloping downwardly toward the rear from a point intermediate the ends thereof, said body being formed to provide generally longitudinally directed, upstanding fins, one at each side of said sloping surface, said fins being so shaped and so angularly related that when air flows longitudinally of and over the body, the transverse components of the resultant air forces which act upon the fins will be directed outwardly.

2. A motor land vehicle body having an upper external surface sloping downwardly toward the rear from a point intermediate the ends thereof, said body being formed to provide generally longitudinally directed, upstanding fins, one at each side of said sloping surface, said fins converging rearwardly, and being otherwise so shaped and disposed that when air flows longitudinally of and over the body, the transverse components of the resultant air forces which act upon the fins will be directed outwardly.

3. A motor land vehicle body having an external surface, and means including a pair of fins projecting outwardly from said body, one fin being disposed at each side of said surface, said fins being so shaped and so angularly related that air flowing rearwardly over said body exerts resultant forces on said fins tending to displace the fins laterally of and away from said surface, whereby flow separation over said surface may be reduced.

4. A motor land vehicle body having an upper external surface sloping downwardly toward the rear from a point intermediate the ends thereof, said body being formed to provide generally longitudinally directed, upstanding fins, one at each side of said sloping surface, said fins being so shaped and so angularly related that when air flows longitudinally of and over the body, the transverse components of the resultant air forces which act upon the fins will be directed outwardly, said surface being formed to provide fillets at the lines of juncture of said fins therewith, said fillets being of substantial and rearwardly increasing radius.

5. A motor land vehicle body having an upper external surface sloping downwardly toward the rear from a point intermediate the ends thereof, said body being formed to provide generally longitudinally directed, upstanding fins, one at each side of said sloping surface, said fins being so shaped and so angularly related that when air flows longitudinally of and over the body, the transverse components of the resultant air forces which act upon the fins will be directed outwardly, said surface being formed to provide fillets at the lines of juncture of said fins therewith, said fillets being of substantial and rearwardly increasing radius.

6. A motor land vehicle body having an upper external surface sloping downwardly toward the rear from a point intermediate the ends thereof, said body being formed to provide generally longitudinally directed, upstanding fins, one at each side of said sloping surface, said fins being so shaped and so angularly related that when air flows longitudinally of and over the body, the transverse components of the resultant air forces which act upon the fins will be directed outwardly, the forward portions of said fins terminating rearwardly of said intermediate point.

ELLIOTT G. REID.